United States Patent [19]

Capelle et al.

[11] Patent Number: 5,647,271
[45] Date of Patent: Jul. 15, 1997

[54] KITCHENWARE WITH THERMAL CONDUCTING SYSTEM

[75] Inventors: Jean-Claude Capelle, Arc Sur Tille; Jean-Jacques Ligny, Velars Sur Duche, both of France

[73] Assignee: SEB, Selongey, France

[21] Appl. No.: 569,860

[22] Filed: Dec. 8, 1995

Related U.S. Application Data

[63] Continuation of Ser. No. 204,204, Mar. 7, 1994, abandoned.

[30] Foreign Application Priority Data

Jul. 6, 1992 [FR] France .................. 92 08346

[51] Int. Cl.⁶ .................................................. A47J 37/10
[52] U.S. Cl. .................. 99/422; 99/447; 126/390; 220/626; 220/636; 220/912
[58] Field of Search .................. 99/422, 447, 401; 126/390; 220/912, 626, 611, 636, DIG. 12

[56] References Cited

U.S. PATENT DOCUMENTS

| | | | |
|---|---|---|---|
| 2,136,708 | 11/1938 | Patrick | 126/390 |
| 4,204,607 | 5/1980 | Zani | 126/390 |
| 4,350,259 | 9/1982 | Cartossi | 126/390 |
| 4,544,818 | 10/1985 | Minamida | 126/390 |
| 4,596,236 | 6/1986 | Eide | 220/626 |
| 5,064,055 | 11/1991 | Bessenbach et al. | 126/390 |

FOREIGN PATENT DOCUMENTS

| | | | |
|---|---|---|---|
| 2846338 | 5/1979 | Germany | 99/422 |

*Primary Examiner*—Reginald Alexander
*Attorney, Agent, or Firm*—Loeb & Loeb LLP

[57] ABSTRACT

A kitchen cooking utensil composed of a receptacle having a thermal conducting bottom (2) intended to be heated especially by induction, the bottom being composed of, from an upper surface to a lower surface of the bottom, at least one metal plate (5) made of a material having a good heat conductivity and at least one metal sheet (6) provided with perforations (10), the sheet (6) being embedded in the plate (5) so that the perforations (10) are filled with metal of the plate (5). The perforations (10) present a cumulative surface of 5 to 20% of the total surface of the sheet, preferably 15 to 20%.

15 Claims, 2 Drawing Sheets

KITCHENWARE WITH THERMAL CONDUCTING SYSTEM

This is a continuation of application Ser. No. 08/204,204 filed as PCT/FR93/00692, Jul. 5, 1993, now abandoned.

TECHNICAL FIELD

The present invention relates to the general technical field of kitchenware with a thermal conducting bottom intended for to be heated especially by induction.

The present invention relates to kitchenware which can be heated by all sources of heat, more precisely to a cooking pot with a thermal conducting bottom intended to be heated especially by induction, said bottom comprising in association a good thermal conducting metal plate coated with a perforated metallic sheet, said sheet generating induced currents.

BACKGROUND OF THE INVENTION

It has already been suggested, e.g. in the U.S. Pat. No. 4,350,259 to manufacture a cooking pot made of stainless steel with a thermal conducting bottom of aluminum and/or of an alloy of this metal. Such a cooking pot is suitable for being heated by different sources of heat, regardless of whether this is by the gas heating devices, an electrical hot plate or by induction. The cooking pot which is produced is composed at least of one, preferably of two layers of aluminum or an alloy containing the metal and of a laminated steel or iron plate fixed in this aluminum layer or inserted between the two aluminum layers. Preferably the laminated bottom plate of steel is magnetized, so that it allows the cooking pot to be heated by induced currents. The laminated iron plate is provided with perforations which can be constituted by simple holes or openings presenting an undulating or zigzag contour, the perforations being intended to permit the aluminum to creep while the bottom is being manufactured. In this way, a direct metallic bond is obtained between the two layers of aluminum.

It must be taken into account that the cooking pots manufactured according to the above-mentioned technique give suitable results. On the other hand, this type of pot does not completely solve the well-known problem of thermal expansion and/or deformations occurring at the bottom. In the action of heat from the heating means lead all more easily to harmful expansions or deformations as the bottom contains several coats of different compound materials. In the longterm a deformation of the cooking pots can be noticed and especially a detachment of the thermal conducting layers or even cracks in the metal continuity between the aluminum layer or layers and the laminated steel plate. The thermal conductivity of the cooking pot is affected which leads in general to a reduced thermal output and to a longer cooking time. In the specific case of cooking pots with a magnetic bottom one will also notice partial cracking in the continuity of the induced currents generated in the steel plate which leads to poor heat transfer.

SUMMARY OF THE INVENTION

The object of the invention consequently aims at solving the various inconveniences mentioned before and especially at supplying a kitchenware that can be heated preferably by induction, and which possesses a better resistance against expansion and/or deformations while maintaining a good continuity of the currents induced in the bottom.

Another object of the invention aims at supplying kitchenware that presents an improved bonding homogeneity between the different layers of the bottom.

The objects assigned to the invention are attained by a kitchenware with thermal conducting bottom intended to be heated especially by induction, said bottom comprising from inside to outside at least one good heat conducting metal plate and at least one metal sheet provided with perforations, said sheet being embedded in the plate so that the perforations are filled with the metal of the plate, characterized in that the perforations present a cumulative surface of 5 to 20 percent of the total surface of the sheet, preferably 15 to 20 percent.

BRIEF DESCRIPTION OF THE DRAWINGS

Other features and advantages of the present invention appear and emerge from the following detailed description with reference to the enclosed drawings which are given as illustrative examples that are not limited, where.

DETAILED DESCRIPTION OF THE INVENTION

Figure 1:
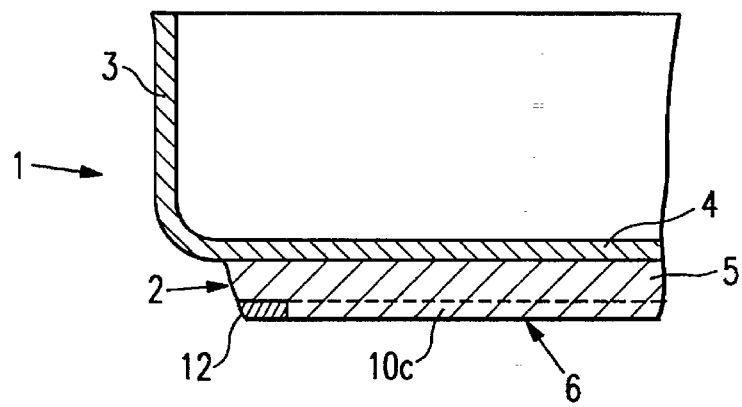
FIG. 1 shows a partial cross section of a cooking utensil according to the invention.

FIG. 1 shows a partial cross section of a cooking utensil in the form of a cooking pot 1 with any appropriate shape, for instance essentially cylindrical, with a thermal conducting bottom 2 from which rise walls 3 of the pot 1. The thermal conducting bottom 2, regardless of its shape, preferably circular, forms a sandwich structure and is, from inside to outside, composed of a succession of elements, beginning with an upper layer 4 e.g. made of stainless steel, extending the side walls 3 and forming the part on which the food is intended to be placed. The underside of the upper layer 4 is covered by a good heat conducting metal plate 5 such as aluminum. The external part of the thermal conducting bottom 2 intended to come into contact with the heating source is composed of a metal sheet 6 e.g. of stainless steel and is preferably magnetic in order to form a stiffening sheet e.g. ferromagnetic which is able to generate an induced current.

Figure 2:
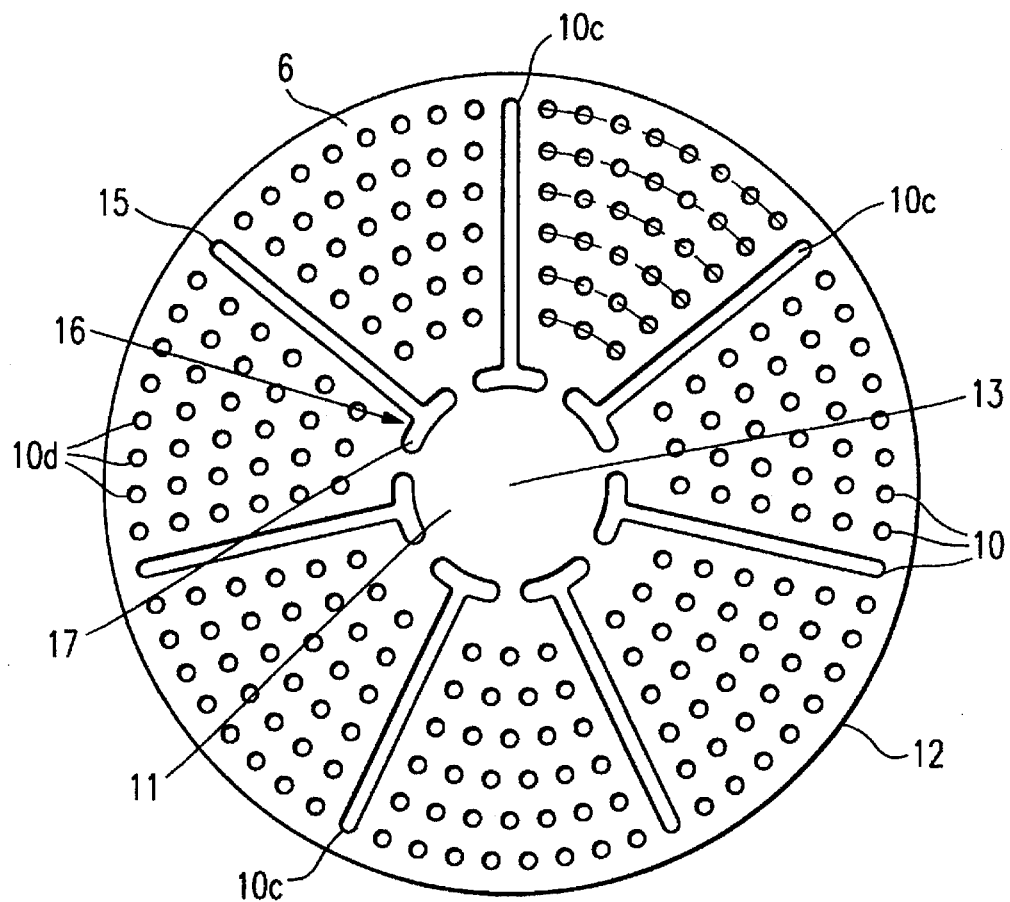
FIG. 2 shows in a view from below the bottom of a first alternative embodiment of the cooking utensil according to the invention.
Figure 3:
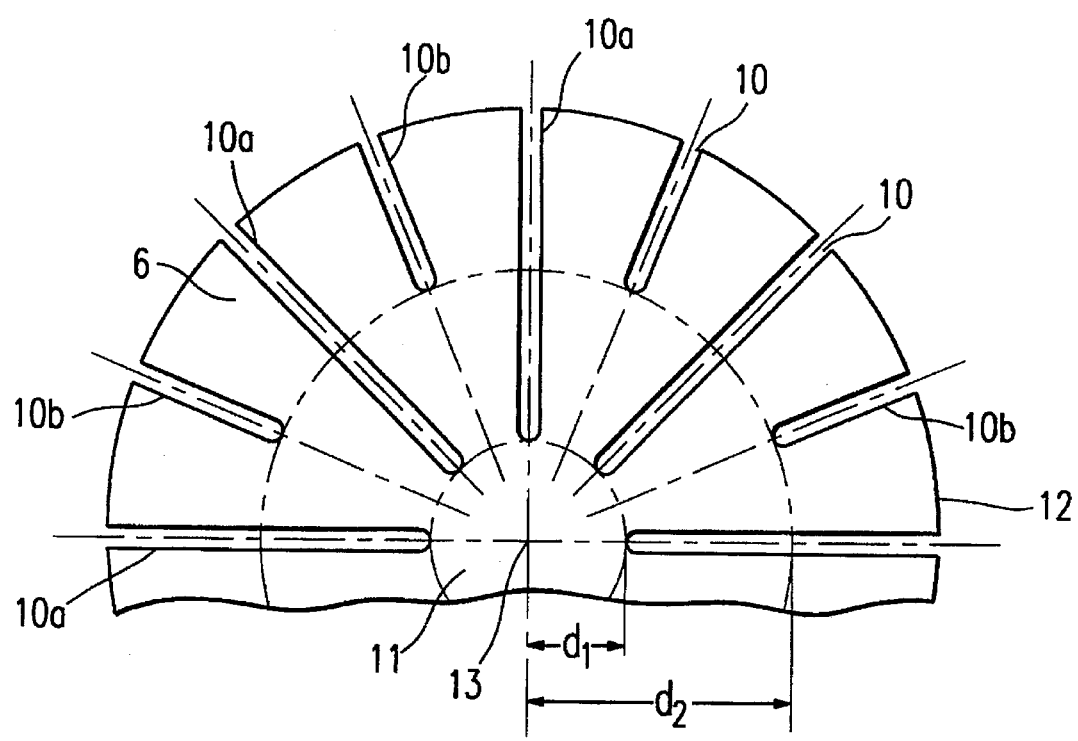
FIG. 3 shows in a view from below a second alternative embodiment of a cooking utensil according to the invention.
Figure 4:
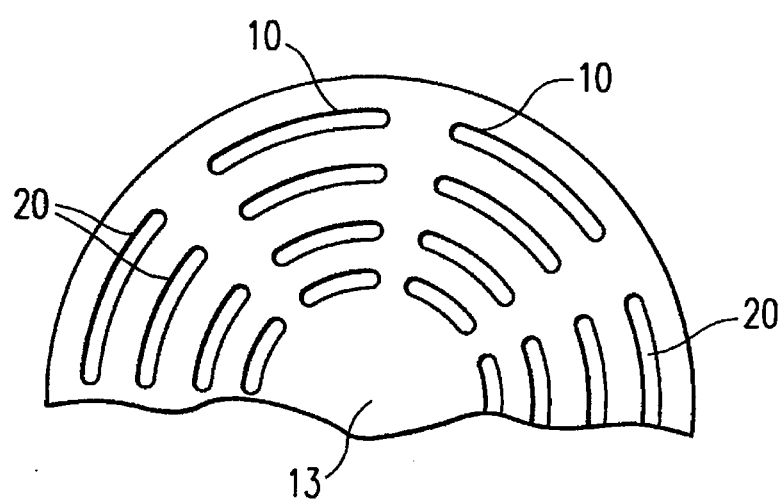
FIG. 4 shows in a view from below the bottom of a third alternative embodiment according to the invention.

According to FIGS. 2 to 4, the metal sheet 6 is provided with perforations 10 which either are or are not distributed uniformly on the surface of the metal sheet 6 in order to guarantee the creep of the material forming the metal plate 5 inside the perforations 10 while the sandwich structure is being manufactured. The metal sheet 6 is fixed on the metal plate 5 by any method that allows at least partial embedding of the sheet 6 in said plate 5. In FIG. 1 material of plate 5 fills a perforation 10c in sheet 6. Ideally, the thermal conducting bottom will be manufactured with the help of a process that includes a hot embossing process as described in the French patent application no. 9103695, dated on Mar. 27, 1991 under the name of the same applicant.

The cooking pot 1 shown in FIG. 3 comprises a metal sheet 6 provided with perforations 10 spreading out radially starting from a geometrical central area 11 to the perimeter 12 of the thermal conducting bottom 2. In the manufacturing alternative embodiment shown in FIG. 3 the geometrical central area 11 is circular and the radial slots 10 spread out at a distance from the center 13 of that area right up to the perimeter 12. Preferably the radial slots 10 consist in two different groups of slots that are different in length, i.e. the first group of radial slots 10a which ends at a distance d1 from the geometrical center 13 and which is shorter than the distance d2 separating the nearer extremity of the second group of radial slots 10b. In the manufacturing alternative shown in FIG. 3, the distance d1 measures 25 mm and corresponds to the radius of the circle forming the geometrical center area 11, whereas the distance d2 measures 67 mm where the total diameter of the thermal conducting bottom 2 measures 204 mm. Advantageously, as shown in FIG. 3, the radial slots 10a, 10b of each group are alternatively arranged on the surface of the thermal conducting bottom 2 in such a way that each radial slot 10a or 10b is surrounded by two radial slots of the other group. It is also advantageous that the number of the radial slots 10a and 10b is 8, and that the slots 10a, 10b are equidistant and spaced out within each group with an angle of 45 degrees.

With regard to assuring a firm bonding between the metal plate 5 and the metal sheet 6 and without affecting the activity of the induced currents it appeared to be especially important to manufacture a metal sheet 6 whose cumulative surface of the perforations 10 represents 5 to 20 percent of the total surface of this sheet. Preferably that cumulative total surface of the perforations 10 lies between 15 and 20 percent of the total surface of the metal sheet 6. In respect of the above mentioned ratios and regardless of the number, the position and the particular shape of the perforations 10, the risks of expansion and/or the deformations are limited and the continuity of the generated induced currents can be maintained. If the thermal conducting bottom 2 only consists of radial slots 10a, 10b, 10c the cumulative surface of this slots lies between 5 and 20 percent of the total surface of the metal sheet 6, preferably between 5 and 10 percent.

The manufacturing alternative shown in FIG. 2 comprises a set of radial slots 10c and a set of openings 10d, preferably circular, distributed uniformly between the sectors delimited by two radial slots 10. The cumulative surface of the openings 10d represents 5 to 10 percent of the total surface of the internal face of the sheet 6, preferably between 8 and 10 percent. In a practical manufacturing example and with a given surface of the thermal conducting bottom the surface of the perforations 10 reaches 18 percent, the radial slots 10c represent 8 percent of the total surface and the openings 10d represent 10 percent. In an other manufacturing example with a larger bottom surface 2 the perforations 10 represent 15 percent of the total surface, the radial slots 10c represent 6.5 percent of the total surface and the openings 10d, 8.5 percent.

In the manufacturing example shown in FIG. 2 the kitchen utensil in accordance with the invention has a thermal conducting bottom 2 provided with at least three, and preferably seven, radial slots 10c where each far extremity 15 lies at a distance from the perimeter 12. Preferably this distance is constant for each radial slot 10c. Each near extremity 16 of the radial slots 10d constitutes a leg 17 situated at a distance from the geometrical center and extending substantially orthogonally from the radial part of the slot 10c in order to form a T-slot. Preferably each leg 17 is bent and forms a circular arc with its center being the geometrical center 13. Advantageously all the legs 17 lie on the same circle. In every sector delimited by two adjoining radial slots 10 the openings 10d are arranged in at least 3, and preferably six, rows of openings. A particular good way of arranging the openings, is to have the openings of the same row lined up on a circle centered in the geometrical center 13, where each row lies on a circle with increasing diameter in a centrifugal direction. It is also advantageous if the distances between the rows and between the openings and the distance between the openings 10d and the radial slots 10 are constant, and preferably identical.

It is obvious that different geometrical configurations are possible without leaving the scope of this invention. In particular it is possible to make openings 10b of constant diameter e.g. measuring 3.5 mm or of variable diameter according to their radial position. Therefore, by way of a good alternative which is not shown in the figures it is possible to let the diameter of the openings 10d vary from row to row, preferably increasing beginning with the nearest row to the legs 17. With such a design and considering, e.g. eight rows of openings 10b, the diameters of the openings 10d in each row in pairs can be of the order of 2.6 mm, 3 mm, 3.4 mm and 3.8 mm.

In the preferred embodiment shown in FIG. 2, it is preferable if the number of openings 10d per row and per sector increases regularly according to the distance of the row in relation to the geometrical center 13. In the example shown in FIG. 2 the increase is one additional opening 10d per row.

The manufacturing alternative shown in FIG. 4 only differs from the previous alternatives by the shape of the perforations 10 which are constituted by a set of curved slots 20. In the embodiment shown in FIG. 4, the bent slots 20 have their concave sides turned to the geometrical center 13 and each form an arc of a circled centered in the above-mentioned center. The curved slots 20 are lined up on concentric circles, preferably equidistant, in numbers of four and spaced out radially and circumferentially to form several sectors. Beginning in the center of each sector, the bent slots 20 have an increasing circumferential length according to their more or less eccentric position in relation to the geometrical center 13.

By mastering the geometry and the dimensions of the perforations, the kitchenware for all heating sources in accordance with the invention and especially in the form of a cooking pot presents good properties of resistance against expansion and/or deformations. Indeed, the mastery of these parameters allows during the manufacturing of the thermal conducting bottom, a homogeneous creep of the aluminum in the volume defined by the perforations, irrespective of whether they are radial, bent or circular, and prevents the formation of uncontrolled bulging during the embossing stage. These good qualities are obtained without restricting the passage and the formation of induced currents, in a way which allows kitchenware to be produced with good resistance against deformations, good thermal conductivity and consequently a good thermal yield.

In all the shown examples, the average width of the radial or bent slots can measure 4 mm.

The kitchenware in accordance with the invention is best represented by a cooking pot, especially a pressure cooker, but it is obvious that every other type of kitchen utensil intended to have a thermal conducting bottom similar to the one described above falls within the scope covered by this invention.

Possibilities of Industrial Application

The invention finds its application in the manufacturing of thermal conducting bottoms for kitchenware for all sources of heat and/or for heating by induced currents, for example, pans, pressure cookers, saucepans and similar products.

What is claimed is:

1. A cooking utensil comprising a receptacle with a thermal conducting bottom (2) intended to be heated especially by induction, where the bottom (2) has an upper surface and a lower surface and comprises, from the upper surface to the lower surface, at least one good heat conducting metal plate (5) and at least one metal sheet (6), said sheet being provided with perforations (10) and being embedded in the plate (5) so that the perforations (10) are filled with the metal of the plate, characterized in that the perforations (10) present a cumulative surface of 5 to 20 percent of the total surface of the sheet, and said perforations comprise a plurality of slots spaced apart from one another and a plurality of circular openings located between said slots.

2. A cooking utensil in accordance with claim 1 characterized in that the slots (10a, 10b, 10c) have a cumulative surface which represents 5 to 20 percent of the total surface of the layer.

3. A cooking utensil in accordance with claim 2 characterized in that the slots (10) are radial slots (10a, 10b, 10c) extending from a geometrical central area (11) of the bottom (2) to a perimeter of the bottom.

4. A cooking utensil in accordance with claim 3 characterized in that the radial slots (10a, 10b, 10c) extend at a distance from the center (13) of the geometrical central area (11) to the perimeter (12) of the bottom (2).

5. A cooking utensil in accordance with claim 4 characterized in that it comprises:

a first group of radial slots (10a) which ends at a distance d1 from the center (13)

a second group of radial slots (10b) which ends at a distance d2 from the geometrical center (13), where d2 is different from d1 and the radial slots (10a, 10b) of each group alternate.

6. A cooking utensil in accordance with claim 3 characterized in that the openings (10d) are distributed uniformly between sectors delineated by the radial slots (10a, 10b, 10c).

7. A cooking utensil in accordance with claim 6 characterized in that the cumulative surface of the openings (10d) represent 5 to 10 percent of the total surface of the sheet.

8. A cooking utensil in accordance with claim 6 characterized in that it comprises:

at least three radial slots (10c) where each far extremity (15) lies at a distance from the perimeter (12) of the bottom (2) and where each near extremity (16) constitutes a leg (17) lying at a distance from the geometrical center (13) and extending orthogonally in the radial part of the slot in order to form a T-slot, and at least three rows of openings allocated in each sector formed by two adjoining radial slots (10c) where each row lies at a different distance from the geometrical center (13).

9. A cooking utensil in accordance with claim 8 characterized in that:

each leg (17) is bent and forms an arc centered in the geometrical center (13) of the bottom (2)

each row of openings (10) beginning with the row next to the leg lies on a circle with increasing diameter centered in the geometrical center (13).

10. A cooking utensil in accordance with claim 8 characterized in that the distances between the rows and between the openings are constant.

11. A cooking utensil in accordance with claim 7 characterized in that the number of the openings (10d) per row and per section increases in accordance with the distance of the row in relation to the geometrical center (13).

12. A cooking utensil in accordance with claim 1 characterized in that the slots are composed of a set of curved slots (20).

13. A cooking utensil in accordance to claim 12 characterized in that the curved slots (20) have their concave sides turned to the geometrical center (13) of the bottom (2) and form a set of arcs of circles centered in the geometrical center (13) of the bottom (2).

14. A cooking utensil in accordance with claim 1 characterized in that it is constituted by a pressure cooker.

15. A cooking utensil in accordance with claim 1 characterized in that the metal sheet (6) is magnetized.

* * * * *

UNITED STATES PATENT AND TRADEMARK OFFICE
CERTIFICATE OF CORRECTION

PATENT NO.  : 5,647,271
DATED       : July 15, 1997
INVENTOR(S) : Jean-Claude CAPELLE and Jean-Jacques LIGNY It is certified that error appears in the above-identified patent and that said Letters Patent is hereby corrected as shown below:

On title page, item [54], and col. 1, line 2,
In the title:

Change "SYSTEM" to -- BOTTOM --.

Signed and Sealed this

Eleventh Day of November, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,647,271
DATED : July 15, 1997
INVENTOR(S) : Jean-Claude CAPELLE and Jean-Jacques LIGNY It is certified that error appears in the above-identified patent and that said Letters Patent is hereby corrected as shown below:

In the title:

Change "SYSTEM" to -- BOTTOM --.

Signed and Sealed this

Fifteenth Day of May, 2001

Attest:

NICHOLAS P. GODICI

Attesting Officer    Acting Director of the United States Patent and Trademark Office